US006929216B2

(12) United States Patent
Bath et al.

(10) Patent No.: US 6,929,216 B2
(45) Date of Patent: Aug. 16, 2005

(54) METHOD AND APPARATUS FOR INSTALLING AND ACTUATING MOVABLE AIRFOILS, INCLUDING CANARDS

(75) Inventors: David L. Bath, Seattle, WA (US); Salvatore Carta, Melbourne (AU); Kelly T. Jones, Snohomish, WA (US); Brian J. Kramer, Seattle, WA (US); Chester P. Nelson, Kirkland, WA (US); Pieter S. Penhall, Melbourne (AU); Joseph R. Pineda, Mukilteo, WA (US); Andrew Sheppard, Melbourne (AU)

(73) Assignee: The Boeing Company, Seattle, WA (US)

( * ) Notice: Subject to any disclaimer, the term of this patent is extended or adjusted under 35 U.S.C. 154(b) by 69 days.

(21) Appl. No.: 10/689,972

(22) Filed: Oct. 20, 2003

(65) Prior Publication Data

US 2004/0140394 A1 Jul. 22, 2004

Related U.S. Application Data

(60) Provisional application No. 60/420,668, filed on Oct. 22, 2002, provisional application No. 60/420,670, filed on Oct. 22, 2002, provisional application No. 60/420,621, filed on Oct. 22, 2002, and provisional application No. 60/420,196, filed on Oct. 21, 2002.

(51) Int. Cl.[7] ............................................... B64C 5/04
(52) U.S. Cl. ...................... 244/45 A; 244/75 R; 244/48
(58) Field of Search ............................ 244/45 R, 45 A, 244/48, 56, 66, 90 R, 89, 75 R (56) References Cited

U.S. PATENT DOCUMENTS

| 384,023 A | * | 6/1888 | Corbett ........................ 384/549 |
| 458,317 A |   | 8/1891 | Hawyer |
| 700,201 A |   | 5/1902 | Howe |
| 2,029,717 A |  | 2/1936 | Howe et al. |
| 2,189,615 A |  | 2/1940 | Rampacher et al. |
| 2,421,694 A | * | 6/1947 | Hawkins .................... 244/75 R |
| 2,788,182 A | * | 4/1957 | Tobin et al. ................... 244/48 |
| 4,281,810 A |  | 8/1981 | Poisson-Quinton |

(Continued)

OTHER PUBLICATIONS

Dryden Flight Research Center EC98 44749–24, Photgraphed Sep. 1998 (1 page) http://www.dfrc.nasa.gov/Gallery/Photo/TU–144LL/Small/EC98–44749–24.jpg [Accessed Oct. 7, 2003].

Dryden Flight Research Center ED96 43549–2, Photographed Mar. 17, 1996 (1 page) http://www.dfrc.nasa.gov/Gallery/Photo/TU–144LL/Small/ED96–43549–2.jpg [Accessed Oct. 7, 2003].

Super70s.com, "Konkordski": The Tu–144, Copyright 2002 (4 pages) http://www.super70s.com/Super70s/Science/Transportation/Aviation/TU–144.asp [Accessed Oct. 7, 2003].

(Continued)

Primary Examiner—Galen Barefoot
(74) Attorney, Agent, or Firm—Perkins Coie LLP (57) ABSTRACT

Methods and apparatuses for installing and actuating movable airfoils, such as canards. A canard in one embodiment of the invention includes an airfoil positioned external to an aircraft fuselage. The airfoil can include a first portion and a second portion (such as a flight control surface) movable relative to the first portion. A connecting portion depends from the airfoil portion and has an attachment portion configured to attach to an aircraft internal to the aircraft fuselage. A connecting portion can include first and second load paths to carry corresponding first and second load portions between the airfoil portion and the attachment portion. The connecting portion can be rotatable about a rotation axis positioned between the first and second loads paths. Accordingly, the connecting portion can be relatively compact so as to reduce the impact of the connecting portion and the volume of the fuselage.

64 Claims, 3 Drawing Sheets

U.S. PATENT DOCUMENTS

| | | | | |
|---|---|---|---|---|
| 4,433,878 A | * | 2/1984 | Rosenthal | 384/549 |
| 4,796,840 A | | 1/1989 | Heynatz | |
| 5,092,539 A | * | 3/1992 | Caero | 244/75 R |
| 5,095,539 A | | 3/1992 | Caero | |
| 5,150,858 A | | 9/1992 | Hopwell | |
| 5,495,999 A | * | 3/1996 | Cymara | 244/45 A |
| 5,887,986 A | | 3/1999 | Pouliquen | |
| 6,064,923 A | * | 5/2000 | Bilange et al. | 701/3 |
| 6,247,667 B1 | | 6/2001 | Fenny | |
| 6,382,556 B1 | | 5/2002 | Pham | |
| 6,695,688 B1 | * | 2/2004 | Owen et al. | 452/187 |
| 6,698,688 B1 | | 3/2004 | Jones | |

OTHER PUBLICATIONS

North American History, "XB–70A First Flight: 1964," (3 pages) http://www.boeing.com/history/bna/xb70.html [Accessed Sep. 18, 2003].

Niu Michael C.Y., "Airframe Structural Design, Practical Design Information and Data on Aircraft Structures," Chapter 10 (pages 358–369), Copyright 1988 Conmilit Press, Ltd., Hong Kong.

Roskam, Dr. Jan, "Airplane Design, Part II: Preliminary Configuration Design and Integration of the Propulsion System,"(5 pages), Copyright Roskam Aviation and Engineering Corporation, Ottawa, Kansas, First Printing: 1985.

Timken, Bearings, Comparing Other Bearing Types(19 pages), Copyright 2002 http://www.timken.com/products/bearings/fundament/compare.asp [Accessed Jun. 26, 2002].

Rockwell International, B–1, AF–1 Test Specimen (1 page).

Flight, F–15, Reed Business Publishing Group, David Hatchard, Sutton 1991 (1 page).

F–15 Diagram (2 pages).

F–18, Fuselage Section—Assembly of Aft Structure (1 page).

F–18, The Boeing Company, Figure 3, Test Fixture (1 page).

F–18, The Boeing Company, Figure 2, Stabilator FT69 Test Article (Ref. E/F End Item Dwg 74T062133) (1 Page).

F–18 Diagram (3 pages).

* cited by examiner

METHOD AND APPARATUS FOR INSTALLING AND ACTUATING MOVABLE AIRFOILS, INCLUDING CANARDS

CROSS-REFERENCE TO RELATED APPLICATIONS

This application claims priority to the following U.S. provisional applications, all of which are incorporated herein by reference: 60/420,668 filed Oct. 22, 2002; 60/420,196 filed Oct. 21, 2002; 60/420,670 filed Oct. 22, 2002; and 60/420,621 filed Oct. 22, 2002.

TECHNICAL FIELD

The present disclosure is directed generally to methods and apparatuses for installing and actuating movable airfoils, including canards.

BACKGROUND

Most existing commercial passenger transport aircraft include a pressurized fuselage, a wing positioned toward the middle of the fuselage, and a tail positioned aft of the wing. The tail typically includes (horizontal) pitch and (vertical) yaw stability and control surfaces, and is mounted to an unpressurized empennage attached to the aft portion of the fuselage. In some arrangements, the entire horizontal portion of the tail moves as a unit relative to the fuselage. In other arrangements, the tail includes a fixed horizontal stabilizer and a movable elevator. In yet another arrangement, the tail includes a slow moving horizontal stabilizer and a fast moving elevator. In any arrangement, the structure required to support the tail surfaces and the actuators required to move the tail surfaces can be located in the unpressurized empennage of the aircraft without impacting the volume of the passenger cabin in the pressurized fuselage.

One drawback with the foregoing arrangement is that it may not be suitable for commercial passenger aircraft having pitch axis stability and control surfaces (such as canards) axially aligned with the pressurized fuselage. For example, integrating the support structure and actuator equipment required for these stability and control surfaces can have a substantial adverse impact on the volume of the passenger cabin.

SUMMARY

The present invention is directed toward methods and apparatuses for installing and actuating movable airfoils, including canards. A canard in one aspect of the invention includes an airfoil portion having a first airfoil surface and a second airfoil surface facing opposite from the first airfoil surface. The airfoil portion is configured to be external to the aircraft fuselage and includes a first portion configured to be exposed to an external flow and a second portion movably coupled to the first portion, with the second portion including a flight control surface. A connecting portion depends from the airfoil portion and can have an attachment portion configured to attach to an aircraft internal to the aircraft fuselage. The connecting portion can have a first load path positioned to carry a first load between the airfoil portion and the attachment portion, and can further have a second load path spaced apart from the first load path and positioned to carry a second load between the airfoil portion and the attachment portion. The connecting portion can be rotatable about a rotation axis positioned between the first and second load paths.

In another aspect of the invention, the airfoil portion can be a first airfoil portion configured to be positioned at a first side of the fuselage, and the canard can further include a second airfoil portion configured to be positioned on a second side of the fuselage. The connecting portion can be positioned between (and can depend from) both the first and second airfoil portions.

In further aspects of the invention, the rotation axis can pass through an interface region between an external part of the airfoil portion and internal part of the airfoil portion. In still another aspect of the invention, the rotation axis can pass through a minimum cross-sectional area of the connecting portion. In any of these aspects of the invention, the second portion of the airfoil portion can include a trailing edge device.

Another aspect of the invention is directed toward a method for operating an aircraft canard, and can include activating an actuator operatively coupled to an airfoil portion of the canard via a connecting portion, wherein the actuator is internal to a fuselage of the aircraft and the airfoil portion is external to the fuselage. The method can further include rotating the connecting portion of the canard, and rotating the airfoil portion of the canard via the connecting portion at a rate of about 20° or more per second. In further aspects of the invention, the canard can include a central portion fixed relative to the connecting portion, and a trailing edge portion movable relative to the central portion, and the method can further include moving the trailing edge portion relative to the central portion.

DETAILED DESCRIPTION

The present disclosure describes methods and apparatuses for installing and actuating movable airfoils, such as canards. Many specific details of certain embodiments of the invention are set forth in the following description and in FIGS. 1–5 to provide a thorough understanding of these embodiments. One skilled in the art, however, will understand that the present invention may have additional embodiments, and that the invention may be practiced without several of the details described below.

Figure 1:
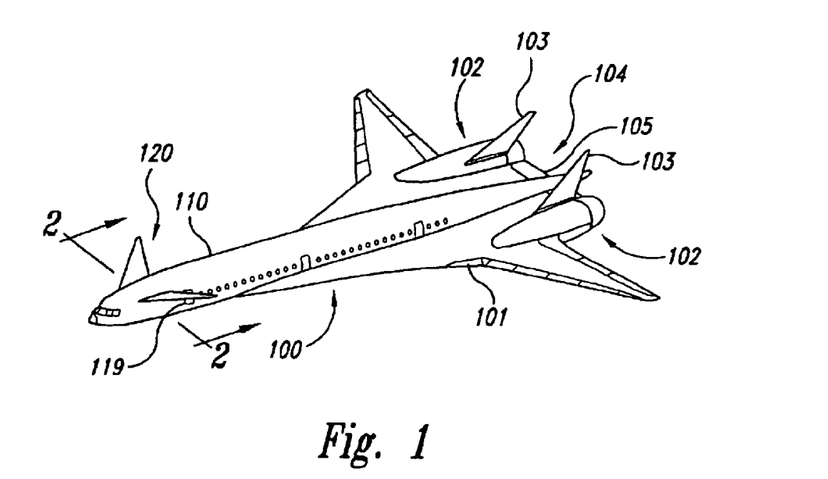
FIG. 1 is a partially schematic, isometric view of an aircraft having a canard assembly in accordance with an embodiment of the invention.

FIG. 1 is a partially schematic, isometric illustration of an aircraft 100 having a canard assembly 120 in accordance with an embodiment of the invention. The canard assembly 120 is attached to a fuselage 110 of the aircraft 100, forward of an aft-mounted wing 101. The aircraft 100 can further include dual propulsion systems 102 integrated with the wing 101, and canted tails 103 mounted at least proximate to the propulsion systems 102 to provide yaw stability and control. An aft body 104 positioned between the propulsion systems 102 and the fuselage 110 can include pitch control surfaces 105 which, together with the canard assembly 120, provide pitch stability and control authority for the aircraft 100.

Figure 2:
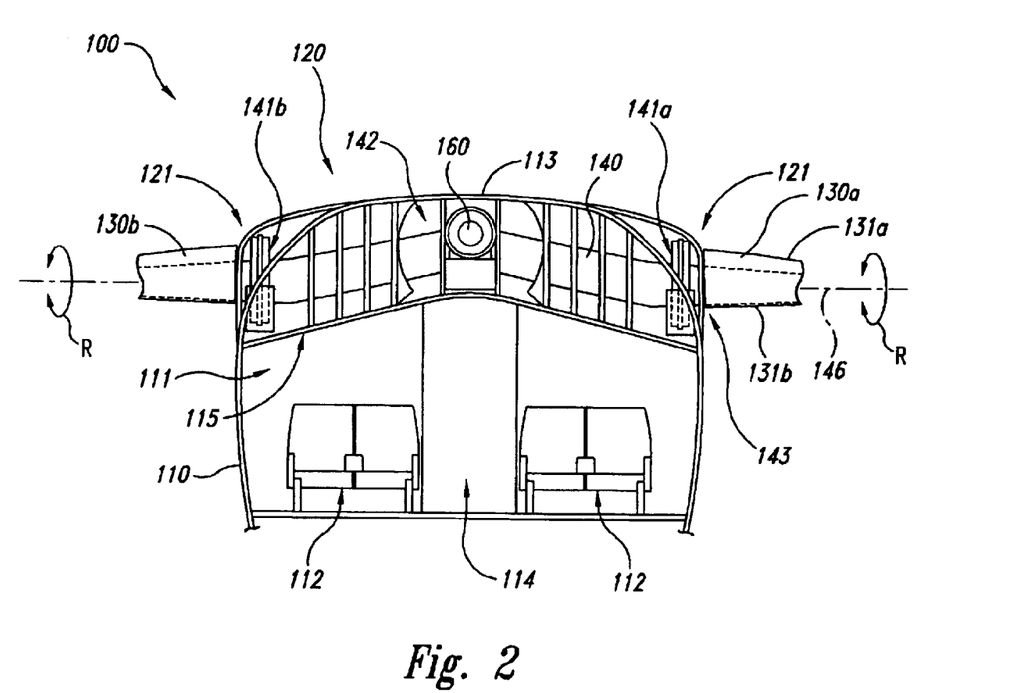
FIG. 2 is a partially schematic, cross-sectional view of a portion of the aircraft shown in FIG. 1 taken substantially along line 2—2.

FIG. 2 is a partially schematic, cross-sectional illustration of an embodiment of the aircraft 100, taken substantially along line 2—2 of FIG. 1. As shown in FIG. 2, the fuselage 110 can include a pressurized cabin 111 having passenger seating 112, one or more aisles 114, galleys, and other features typical of commercial aircraft passenger cabins. The fuselage 110 can further include an unpressurized canard housing 113 positioned above the passenger cabin 111. A ceiling 115 is positioned between the pressurized cabin 111 and the canard housing 113. As described in greater detail below, the canard housing 113 can be sized and positioned to movably support the canard assembly 120 while preserving a large volume for the pressurized cabin 111.

In one embodiment, the canard assembly 120 includes two airfoil portions 130 (shown as a left airfoil portion 130a and a right airfoil portion 130b). Each airfoil portion 130 can include a first or upper surface 131a and a second or lower surface 131b. The airfoil portions 130 can be connected with a connecting portion 140 (such as a spindle) that extends between the airfoil portions 130 through the canard housing 113. Accordingly, the airfoil portions 130 extend external to the fuselage 110, and the connecting portion 140 extends internal to the fuselage 110. An interface region 121 of the canard assembly 120 can be aligned with an external wall of the fuselage 110, between the external portions and the internal portions of the canard assembly 120.

In another aspect of this embodiment, the connecting portion 140 includes two attachment portions 141 (shown as a left attachment portion 141a and a right attachment portion 141b). The attachment portions 141 couple the connecting portion 140 to the fuselage 110 while allowing the connecting portion 140 and the airfoil portions 130 to move relative to the fuselage 110. For example, in one embodiment, the connecting portion 140 and the airfoils 130 can rotate as a unit about a rotation axis 146, as indicated by arrows R. Accordingly, the connecting portion 140 can be coupled to an actuator 160 for active rotation about the rotation axis 146. In other embodiments, the airfoil portions 130 and/or the connecting portion 140 can move relative to the fuselage 110 in other manners.

In a particular aspect of an embodiment in which the connecting portion 140 rotates relative to the fuselage 110, the rotation axis 146 can pass through the interface region 121, and through a minimum cross-sectional area 143 of the connecting portion 140. In another aspect of this embodiment, the connecting portion 140 can include an intermediate region 142 positioned between the attachment portions 141 directly along the rotation axis 146 or offset vertically away from the rotation axis 146. In a further aspect of this embodiment, the intermediate region 142 can have a cross-sectional area that is the same as or larger than that of the minimum cross-sectional area 143. As described in greater detail below with reference to FIGS. 3 and 4, the foregoing features can reduce the impact of the airfoil portions 130 and associated actuation systems on the volume of the pressurized cabin 111.

Figure 3:
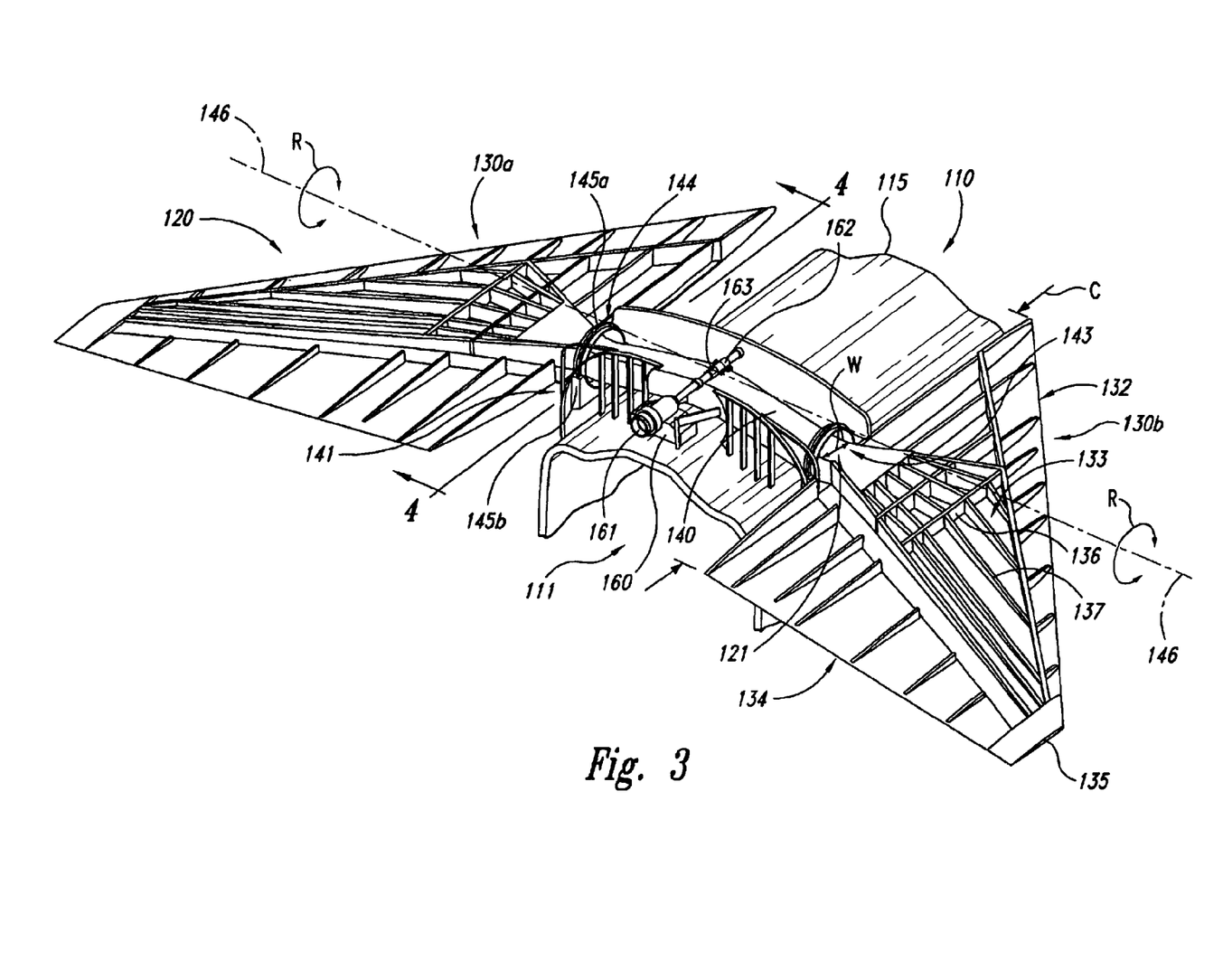
FIG. 3 is a partially schematic, top rear isometric view of a canard assembly configured in accordance with an embodiment of the invention.

FIG. 3 is a partially cutaway, top isometric view of an embodiment of the canard assembly 120 and a portion of the fuselage 110. In one aspect of this embodiment, the airfoil portions 130 of the canard assembly 120 each include a central portion 133, a leading edge 132 forward of the central portion 133, a trailing edge device 134 (e.g., an elevator) aft of the central portion 133, and an outboard tip 135. In one aspect of this embodiment, the trailing edge device 134 can be movable relative to the central portion 133, for example, to provide trim control for the airfoil portion 130. Accordingly, the trailing edge device 134 can be operatively coupled to an actuator (not shown in FIG. 3) positioned in the central portion 133, while the central portion 133 provides pitch control. As a result, the central portion 133 can be actuated at a more rapid rate than the trailing edge device 134. This is unlike some conventional aft-mounted tail arrangements where an all-moving (and slow moving) tail provides trim control and a rapidly moving trailing edge elevator provides pitch control. In other embodiments, the trailing edge can be fixed relative to the central portion 133. In still further embodiments, the leading edge 132 can be movable relative to the central portion 133.

In any of the foregoing embodiments, the components of the airfoil portions 130 can include longitudinal spars 136 and/or transverse stringers 137 arranged to provide a generally rigid structure. In a particular aspect of this embodiment, the stringers 137 of the central portion 133 can converge as they extend inboard toward the fuselage 110. In a further aspect of this embodiment, the stringers 137 can be integrally connected to the connecting portion 140 to provide a strong structural link between the connecting portion 140 and the airfoil portions 130. In other embodiments, the airfoil portions 130 can have other structural arrangements, including a laminated core construction.

In still a further aspect of this embodiment, the connecting portion 140 can have its minimum cross-sectional area 143 positioned proximate to the interface region 121 between the portion of the canard assembly 120 external to the fuselage 110 and the portion of the canard assembly 120 internal to the fuselage 110. The minimum cross-sectional area 143 can have a width W (e.g., in a chordwise direction) that is relatively small compared to a maximum chord length C of the airfoil 130. For example, in one aspect of this embodiment, the width W can have a value that ranges from about 5% to about 15% of the maximum chord length C. In a particular embodiment, the width W can have a value of about 7% of the maximum chord length C. In any of these embodiments, the rotation axis 146 can pass through the minimum cross-sectional area 143. Accordingly, the maximum excursion of any point on the connecting portion 140 relative to its neutral position is relatively small, even when the airfoil portions 130 rotate through relatively large angular deflections.

In one embodiment, the airfoil portions 130 can rotate through a total angular deflection of about 40° relative to the neutral position. In a particular aspect of this embodiment, the total angular deflection can include about 15° of upward excursion (e.g., with the leading edge 132 deflected upwardly relative to its neutral position by 15°) and about 25° of downward deflection (e.g., with the leading edge 132 deflected downwardly from its neutral position by 25°). In other embodiments, the airfoil portions 130 can rotate through other angular ranges, and/or the angular ranges can have different upward and/or downward components. In any of these embodiments, the impact of these deflections on the available volume of the pressurized cabin 111 can be relatively small because, for example, (a) the connecting portion 140 has a relatively small cross-sectional area, relative to the maximum chord length of the airfoil portions 130 and (b) the rotation axis 146 passes through the interface region 121 and the minimum cross-sectional area 143.

In one embodiment, the attachment portions 141 each include a bearing 144 positioned to allow rotational motion of the connecting portion 140. In one aspect of this embodiment, each bearing 144 can include an arcuate first bearing surface 145a depending from the connecting portion 140 and engaged with an arcuate second bearing surface 145b depending from the fuselage 110. The bearing 144 can include a ball bearing arrangement, a roller bearing arrangement or other bearing arrangements known to those of ordinary skill in the art. In any of these embodiments, the bearing 144 can accommodate the rotational motion of the connecting portion 140 and the airfoil portions 130 relative to the fuselage 110.

An actuator 160 imparts the rotational motion to the connecting portion 140. In one embodiment, the actuator 160 includes a rotary motor 161 coupled to a ball screw 162. The ball screw 162 can engage a corresponding ball nut 163 which is coupled to the connecting portion 140 with a gimbal mount. As the shaft of the motor 161 rotates, the ball screw 162 threadably engages the ball nut 163, driving the nut 163 forward and aft along an arcuate path, which rotates the connecting portion 140 and the airfoil portions 130 about the rotation axis 146. In a particular aspect of this embodiment, the actuator 160 can operate at relatively high rates. For example, the actuator 160 can drive the airfoil portions 130 at a rate of about 20° or more per second. In a particular example, the airfoil portions 130 can move at a rate of about 40° or more per second. The ball screw 162 can rotate at rates up to and above 900 rpm to provide the rapid rotation rate of the airfoil portions 130. In other embodiments, the actuator 160 can include other arrangements and can operate at other speeds. For example, the actuator 160 can include a linear actuator and/or a rack and pinion arrangement.

Figure 4:
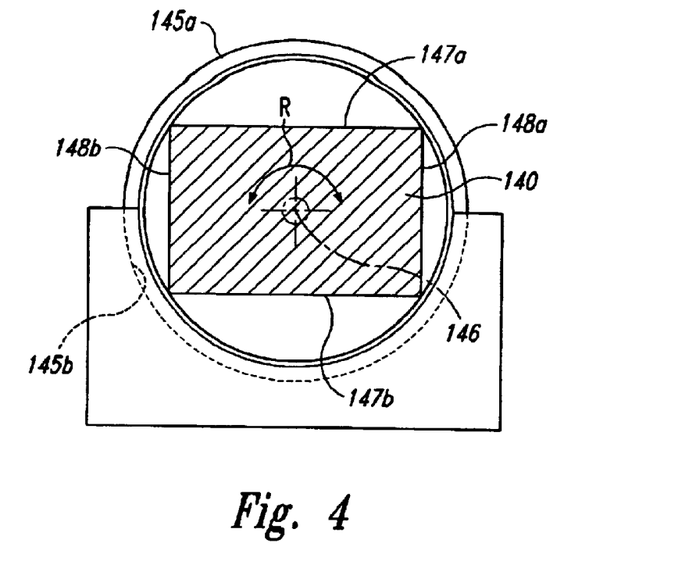
FIG. 4 is a partially schematic, cross-sectional view of a connecting portion of a canard assembly configured in accordance with an embodiment of the invention.
Figure 5:
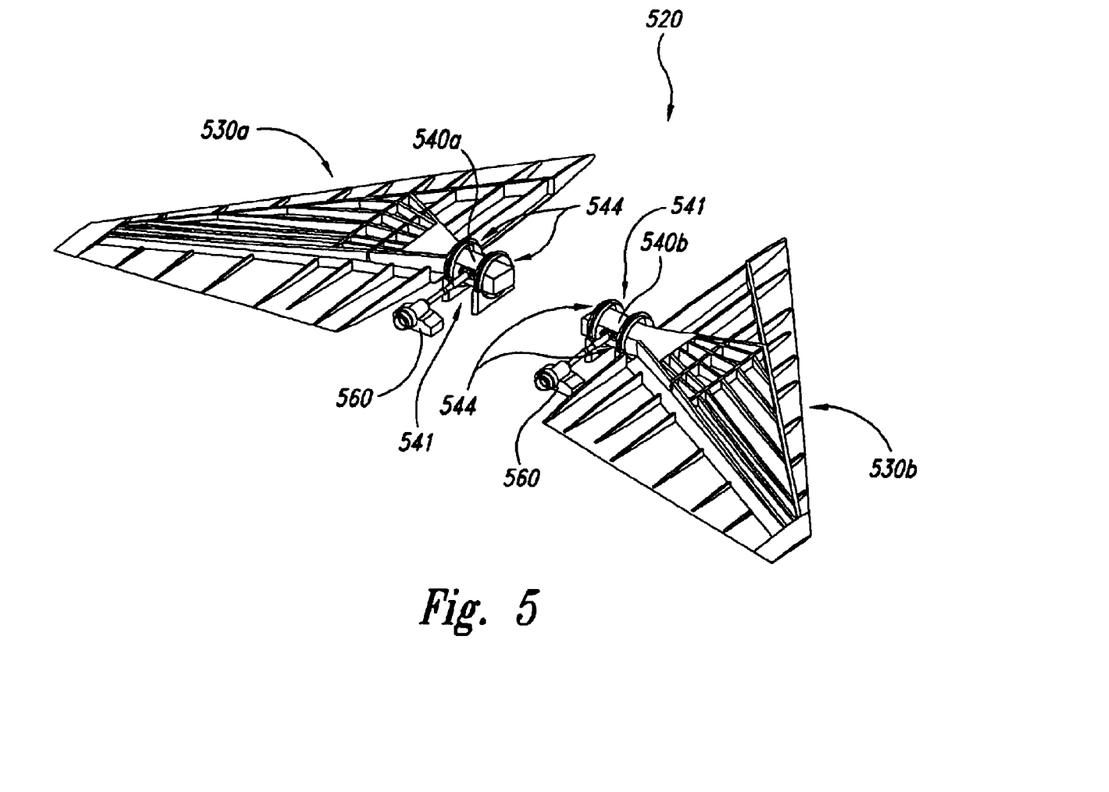
FIG. 5 is a top rear isometric view of a canard assembly having cantilevered airfoils in accordance with another embodiment of the invention.

FIG. 4 is a partially schematic illustration of part of the connecting portion 140 taken substantially along line 4—4 of FIG. 3. In one embodiment, the connecting portion 140 can have a generally rectangular cross-sectional shape, and in other embodiments, the connecting portion 140 can have other cross-sectional shapes. In any of these embodiments, the connecting portion 140 can be configured to carry bending loads from the airfoil portions 130 (FIG. 3) to the fuselage 110 (FIG. 3). For example, when the airfoil portions 130 are subjected to vertical loads, the connecting portion 140 can transmit bending loads along first and second vertical load paths 147a and 147b. When the airfoils 130 are subjected to longitudinal loads, the connecting portion 140 can transmit loads along first and second longitudinal load paths 148a, 148b. The rotation axis 146 can be positioned between any pair of load paths to provide for a compact arrangement with a relatively low rotational moment of inertia.

One feature of an embodiment of the canard assembly 120 described above with reference to FIGS. 1–4 is that the connecting portion 140 has a relatively small cross-sectional area, and a relatively small width W compared to the maximum chord length C of the airfoil portions 130 that it supports. An advantage of this feature is that the connecting portion 140 occupies a relatively small volume within the fuselage 110, while still providing adequate support to the airfoil portions 130. Accordingly, the impact of the connecting portion 140 on the volume of the pressurized cabin 111 is relatively small. This is unlike some existing canard attachment arrangements for which the structure passing into the aircraft fuselage has a width of from about 50% to about 75% of the maximum chord length of the corresponding airfoil.

Another feature of an embodiment of the canard assembly 120 described above with reference to FIGS. 1–4 is that the rotation axis 146 passes through the interface region 121, the minimum cross-sectional area 143, and/or a region between the load paths that carry loads from the airfoil portions 130 to the fuselage 110. Accordingly, points on the connecting portion 140 remain relatively close to the rotation axis 146 as the airfoil portions 130 rotate. This is unlike some existing tail attachment arrangements for which the attachment structure is pivoted at its extreme forward or aft edge and accordingly sweeps out a large volume as it rotates. An advantage of arrangements in accordance with embodiments of the present invention is that the impact of the connecting portion 140 on the volume of the pressurized cabin 111 can be substantially less than with conventional arrangements, even though the airfoil portions 130 rotate through a relatively large angular range. Another advantage of this arrangement is that the rotational moment of inertia of the connecting portion 140 is relatively small, which allows the connecting portion 140 to be rotated at relatively high speeds.

Still another feature of an embodiment of the canard assembly 120 described above with reference to FIGS. 1–4 is that the connecting portion 140 can include an intermediate region 142 that is vertically offset from the attachment portions 141. An advantage of this feature is that the canard housing 113 into which the connecting portion 140 fits can be vertically offset over the aisle 114 of the pressurized cabin 111, allowing for greater mobility of the passengers within.

Yet another feature of an embodiment of the canard assembly 120 is that it can include an all-moving, high rotation rate central portion 133 and an independently movable trailing edge device 134. The design, when coupled with a fly-by-wire control system, can allow for the rapid attainment of maximum control authority when needed, while still maintaining the ability to position the surfaces optimally for best airplane performance. This design can also reduce the size of the canard assembly 120, thus providing weight and cost benefits to the aircraft on which it is installed. Another advantage of this arrangement is that the trailing edge devices 134 on opposite sides of the fuselage 110 can be independently actuated in an asymmetric fashion to generate yaw control, which can allow for a reduction in the size of the aircraft vertical tails, providing another potential weight and cost benefit.

In other embodiments, the canard assembly can have other arrangements that also have a reduced impact on the volume of the pressurized cabin 111 of the fuselage 110. For example, in one embodiment shown in FIG. 5, a canard assembly 520 can include airfoil portions 530a and 530b, each of which has a separate connecting portion 540 (shown as a first connecting portion 540a and a second connecting portion 540b). Each connecting portion 540 extends into the fuselage 110 (FIG. 2) and includes a corresponding attachment portion 541. The attachment portions 541 can each include two bearings 544 that support the airfoil portions 530 in a dual cantilevered arrangement. Each connecting portion 540 can also be coupled to an actuator 560 to drive the airfoil portions 530 through a range of angles at a range of angular velocities generally similar to those described above with reference to FIGS. 1–4. The structure required to support and operate the actuators 560 can be positioned in opposing vertically aligned, closet-type structures in the fuselage 110. Accordingly, an advantage of this arrangement is that it can have a reduced impact on the head room within the pressurized cabin 111. Conversely, an advantage of the arrangement described above with reference to FIGS. 1–4 is that it does not have a substantial impact on the lateral volume of the pressurized cabin 111. A further advantage of the arrangement described above with reference to FIGS. 1–4 is that the connecting portion 140 extends entirely through the fuselage 110 and is attached to both airfoil portions 130, which is generally structurally more efficient than the cantilevered arrangement shown in FIG. 5.

From the foregoing, it will be appreciated that, although specific embodiments of the invention have been described herein for purposes of illustration, various modifications may be made without deviating from the spirit and scope of the invention. For example, embodiments of the canard arrangement can be implemented on aircraft having configurations different than that shown in FIG. 1. Other arrangements of structures having characteristics in common with those disclosed herein are included in the following pending U.S. Applications, both of which are filed concurrently herewith and both of which are incorporated herein by reference: Ser. No. 10/690,283, entitled "Method and Apparatus for Actuating Movable Components, Including Canards, Over Multiple Ranges," and Ser. No. 10/690,285, entitled "Method and Apparatus for Rotatably Supporting Movable Components, Including Canards," Accordingly, the invention is not limited except as by the appended claims.

We claim:

1. A canard for an aircraft, comprising:
    an airfoil portion having a first airfoil surface and a second airfoil surface facing opposite from the first airfoil surface, the airfoil portion being configured to be positioned external to an aircraft fuselage, the airfoil portion having a first portion configured to be exposed to a flow external to the fuselage, the airfoil portion further having a second portion movably coupled to the first portion, the second portion including a flight control surface; and
    a connecting portion depending from the airfoil portion and having an attachment portion configured to attach to an aircraft internal to the aircraft fuselage, the connecting portion having a first load path positioned to carry a first load portion between the airfoil portion and the attachment portion, the connecting portion further having a second load path spaced apart from the first load path and positioned to carry a second load portion between the airfoil portion and the attachment portion, the connecting portion being rotatable about a rotation axis positioned between the first and second load paths with at least part of the connecting portion eccentric relative to the rotation axis.

2. The canard of claim 1 wherein the second portion of the airfoil portion includes a deployable trailing edge device.

3. The canard of claim 1 wherein the connecting portion includes:
    a first arcuate bearing surface positioned at a first constant radial distance from the rotation axis and being rotatable with the connecting portion; and
    a second arcuate bearing surface coupled to the first arcuate bearing surface and positioned at a second constant radial distance from the rotation axis, the second arcuate bearing surface being rotatable relative to the first arcuate bearing surface and the connecting portion.

4. The canard of claim 1, further comprising an actuator coupled to the connecting portion to move the connecting portion relative to the fuselage.

5. The canard of claim 1, further comprising an actuator coupled to the connecting portion to rotate the airfoil portion at a rate of about 20 degrees or more per second.

6. The canard of claim 1, further comprising a ball screw actuator coupled to the connecting portion to rotate the connecting portion and the airfoil portion, wherein the ball screw actuator is configured to rotate at a speed of about 900 rpm or more.

7. The canard of claim 1, further comprising an actuator coupled to the connecting portion to rotate the airfoil portion through about 40 degrees or more.

8. The canard of claim 1 wherein the airfoil portion has a maximum chord length, and wherein the connecting portion has a chordwise dimension of from about 5% to about 15% of the maximum chord length.

9. The canard of claim 1 wherein the airfoil portion is a first airfoil portion configured to be positioned on a first side of the fuselage, and wherein the canard further comprises a second airfoil portion configured to be positioned on a second side of the fuselage opposite the first side of the fuselage, and wherein the connecting portion is positioned between the first and second airfoil portions and depends from both the first and second airfoil portions.

10. The canard of claim 1 wherein the attachment portion is configured to attach to a non-pressurized portion of the fuselage.

11. The canard of claim 1 wherein the connecting portion has a minimum cross-sectional area, and wherein the connecting portion and the airfoil portion are rotatable as a unit about a rotation axis passing through the minimum cross-sectional area.

12. The canard of claim 1 wherein the second portion includes a trailing edge device movably coupled toward an aft part of the first portion, and wherein the airfoil portion further includes a leading edge device movably coupled toward a forward part of the first portion.

13. The canard of claim 1 wherein the first portion of the airfoil portion is coupled to a first actuator to move at a first maximum rate, and wherein the second portion of the airfoil portion includes a trailing edge device coupled to a second actuator to move at a second maximum rate less than the first maximum rate.

14. A canard for an aircraft, comprising:
    an airfoil portion having a first airfoil surface and a second airfoil surface facing opposite from the first airfoil surface, the airfoil portion being configured to be positioned external to an aircraft fuselage, the airfoil portion having a first portion configured to be exposed to an external flow, the airfoil portion further having a second portion movably coupled to the first portion, the second portion including a flight control surface; and
    a connecting portion depending from the airfoil portion and having an attachment portion configured to attach the connecting portion to an aircraft internal to the aircraft fuselage, the connecting portion having an interface region positioned to align with an external surface of the aircraft fuselage, the connecting portion and the airfoil portion being rotatable as a unit about a rotation axis passing through the interface region, wherein at least part of the connecting portion is eccentrically offset relative to the rotation axis.

15. The canard of claim 14 wherein the second portion of the airfoil portion includes a deployable trailing edge device.

16. The canard of claim 14, further comprising:
    a first arcuate bearing surface positioned at a first constant radial distance from the rotation axis and being rotatable with the connecting portion; and
    a second arcuate bearing surface coupled to the first arcuate bearing surface and positioned at a second constant radial distance from the rotation axis, the second arcuate bearing surface being rotatable relative to the first arcuate bearing surface and the connecting portion.

17. The canard of claim 14, further comprising an actuator coupled to the connecting portion to rotate the airfoil portion at a rate of about 20 degrees or more per second.

18. The canard of claim 14, further comprising a ball screw actuator coupled to the connecting portion to rotate the connecting portion and the airfoil portion, wherein the ball screw actuator is configured to rotate at a speed of about 900 rpm or more.

19. The canard of claim 14 wherein the airfoil portion has a maximum chord length, and wherein the connecting portion has a chordwise dimension of from about 5% to about 15% of the maximum chord length.

20. The canard of claim 14 wherein the airfoil portion is a first airfoil portion configured to be positioned on a first side of the fuselage, and wherein the canard further comprises a second airfoil portion configured to be positioned on a second side of the fuselage opposite the first side of the fuselage, further wherein the connecting portion is positioned between the first and second airfoil portions and depends from both the first and second airfoil portions.

21. The canard of claim 14 wherein the connecting portion has a minimum cross-sectional area, and wherein the connecting portion and the airfoil portion are rotatable as a unit about a rotation axis passing through the minimum cross-sectional area.

22. A canard for an aircraft, comprising:
an airfoil portion having a first airfoil surface and a second airfoil surface facing opposite from the first airfoil surface, the airfoil portion being configured to be positioned external to an aircraft fuselage, the airfoil portion having a first portion configured to be exposed to an external flow, the airfoil portion further having a second portion movably coupled to the first portion, the second portion including a flight control surface; and
a connecting portion depending from the airfoil portion and having an attachment portion configured to attach to an aircraft internal to the aircraft fuselage, the connecting portion having a minimum cross-sectional area, the connecting portion and the airfoil portion being rotatable as a unit about a rotation axis passing through the minimum cross-sectional area, with at least part of the connecting portion eccentric relative to the rotation axis.

23. The canard of claim 22 wherein the second portion of the airfoil portion includes a trailing edge device.

24. The canard of claim 22, further comprising an actuator coupled to the connecting portion to rotate the airfoil portion at a rate of about 20 degrees or more per second.

25. The canard of claim 22, further comprising a ball screw actuator coupled to the connecting portion to rotate the connecting portion and the airfoil portion, wherein the ball screw actuator is configured to rotate at a speed of about 900 rpm or more.

26. The canard of claim 22 wherein the airfoil portion has a maximum chord length, and wherein the connecting portion has a chordwise dimension of from about 5% to about 15% of the maximum chord length.

27. The canard of claim 22 wherein the airfoil portion is a first airfoil portion configured to be positioned on a first side of the fuselage, and wherein the canard further comprises a second airfoil portion configured to be positioned on a second side of the fuselage opposite the first side of the fuselage, and wherein the connecting portion is positioned between the first and second airfoil portions and depends from bath the first and second airfoil portions.

28. The canard of claim 22 wherein the airfoil portion includes:
a central portion fixed relative to the connecting portion; and
a trailing edge portion movable relative to the central portion and the connecting portion.

29. A canard for an aircraft, comprising:
a first airfoil portion having a first airfoil surface and a second airfoil surface facing opposite from the first airfoil surface, the first airfoil portion being configured to be positioned external to an aircraft fuselage;
a second airfoil portion having a third airfoil surface and a fourth airfoil surface facing opposite from the third airfoil surface, the second airfoil portion being configured to be positioned external to an aircraft fuselage; and
a connecting portion extending between the first and second airfoil portions and having first and second attachment portions configured to attach to an aircraft internal to the aircraft fuselage, the connecting portion having an intermediate region between the first and second attachment portions, the intermediate region being offset from rotation axis extending between the first and second attachment portions, wherein the first and second airfoil portions are rotable about the rotation axis.

30. The canard of claim 29, further comprising an actuator coupled to the connecting portion to rotate the airfoil portion at a rate of about 20 degrees or more per second.

31. The canard of claim 29, further comprising a ball screw actuator coupled to the connecting portion to rotate the connecting portion and the airfoil portion, wherein the ball screw actuator is configured to rotate at a speed of about 900 rpm or more.

32. The canard of claim 29 wherein the airfoil portion has a maximum chord length, and wherein the connecting portion has a chordwise dimension of from about 5% to about 15% of the maximum chord length.

33. The canard of claim 29 wherein the airfoil portion is a first airfoil portion configured to be positioned on a first side of the fuselage, and wherein the canard further comprises a second airfoil portion configured to be positioned on a second side of the fuselage opposite the first side of the fuselage, and wherein the connecting portion is positioned between the first and second airfoil portions and depends from both the first and second airfoil portions.

34. The canard of claim 29 wherein the airfoil portion includes:
a central portion fixed relative to the connecting portion; and
a trailing edge portion movable relative to the central portion and the connecting portion.

35. A canard for an aircraft, comprising:
an airfoil portion having a first airfoil surface and a second airfoil surface facing opposite from the first airfoil surface, the airfoil portion being configured to be positioned external to an aircraft fuselage;
a connecting portion depending from the airfoil portion and having an attachment portion configured to attach to an aircraft internal to the aircraft fuselage; and
an actuator operatively coupled to the connecting portion, the actuator being configured to rotate the connecting portion and the airfoil portion at a rate of about 20 degrees per second or more.

36. The canard of claim 35 wherein the connecting portion has a first load path positioned to carry a first load portion between the airfoil portion and the attachment portion, the connecting portion further having a second load path spaced apart from the first load path and positioned to carry a second load portion between the airfoil portion and the attachment portion, the connecting portion being rotatable about a rotation axis positioned between the first and second load paths.

37. The canard of claim 35 wherein the actuator is coupled to the connecting portion to rotate the airfoil portion at a rate of about 40 degrees or more per second.

38. The canard of claim 35, further comprising a ball screw actuator coupled to the connecting portion to rotate the connecting portion and the airfoil portion, wherein the ball screw actuator is configured to rotate at a speed of about 900 rpm or more.

39. The canard of claim 35, wherein the airfoil portion has a maximum chord length, and wherein the connecting portion has a chordwise dimension of from about 5% to about 15% of the maximum chord length.

40. The canard of claim 35 wherein the airfoil portion is a first airfoil portion configured to be positioned on a first side of the fuselage, and wherein the canard further comprises a second airfoil portion configured to be positioned on a second side of the fuselage opposite the first side of the fuselage, and wherein the connecting portion is positioned between the first and second airfoil portions and depends from both the first and second airfoil portions.

41. The canard of claim 35 wherein the airfoil portion includes:
  a central portion fixed relative to the connecting portion; and
  a trailing edge portion movable relative to the central portion and the connecting portion.

42. An aircraft, comprising:
  a fuselage having a passenger cabin, first side and a second side opposite the first side;
  a wing attached to the fuselage;
  a canard attached to the fuselage forward of the wing, the canard including:
    a first airfoil positioned on the first side of the fuselage, a central portion and a trailing edge portion movable relative to the central portion;
    a second airfoil positioned on the second side of the fuselage;
    a connecting member coupled to the first and second airfoils and passing through the fuselage above the passenger cabin, the connecting member having a first load path positioned to carry a first load portion between the first and second airfoils, the connecting member further having a second load path spaced apart from the first load path and positioned to carry a second load portion between the first and second airfoils, the connecting member being rotatable about a rotation axis relative to the fuselage to rotate the first and second airfoils relative to the fuselage, the rotation axis being positioned between the first and second load paths.

43. The aircraft of claim 42 wherein the first and second airfoil portions each have a central portion and a trailing edge portion movable relative to the central portion.

44. The aircraft of claim 42 wherein the connecting member includes first and second attachment portions configured to attach to an aircraft internal to the aircraft fuselage, the connecting member having an intermediate region between the first and second attachment portions, the intermediate region being offset from an axis extending between the first and second attachment portions.

45. The aircraft of claim 42, further comprising an actuator coupled to the connecting member to rotate the airfoil portion at a rate of about 20 degrees or more per second.

46. The aircraft of claim 42, further comprising a ball screw actuator coupled to the connecting member to rotate the connecting member and the airfoils, wherein the ball screw actuator is configured to rotate at a speed of about 900 rpm or more.

47. The aircraft of claim 42, wherein at least one of the airfoils has a maximum chord length, and wherein the connecting member has a chordwise dimension of from about 5% to about 15% of the maximum chord length.

48. The aircraft of claim 42 wherein the fuselage includes a passenger cabin portion, and wherein the connecting portion is attached to the fuselage external to the passenger cabin portion.

49. An aircraft, comprising:
  fuselage means for carrying a payload, the fuselage means including a passenger cabin;
  wing means for lifting the fuselage means; and
  canard means for controlling pitch axis motion of the fuselage means, the canard means being positioned forward of the wing means and including:
    first airfoil means for controlling the pitch axis motion, the first airfoil means being positioned on a first side of the fuselage;
    second airfoil means for controlling the pitch axis motion, the second airfoil means being positioned on a second side of the fuselage;
    connecting means for connecting the first and second airfoil means, the connecting means passing through the fuselage means above the passenger cabin and having a first load path positioned to carry a first load portion between the first and second airfoil means, the connecting means further having a second load path spaced apart from the first load path and positioned to carry a second load portion between the first and second airfoil portions, the connecting portion being rotatable about a rotation axis relative to the fuselage to rotate the first and second airfoils relative to the fuselage means, the rotation axis being positioned between the first and second load paths.

50. The aircraft of claim 49 wherein each of the airfoil means includes a first portion fixed relative to the connecting means, and wherein each of the airfoil means includes a second portion movable relative to the first portion, the second portion including a flight control surface.

51. A method for installing an aircraft canard, comprising:
  positioning an airfoil portion of the canard external to an aircraft fuselage, the airfoil portion having a first portion configured to be exposed to an external flow, the airfoil portion further having a second portion movably coupled to the first portion, and the second portion including a flight control surface;
  positioning a connecting portion of the canard internal to the fuselage, the connecting portion having an attachment portion, the connecting portion further having a first load path positioned to carry a first load portion between the airfoil portion and the attachment portion, the connecting portion still further having a second load path spaced apart from the first load path and positioned to carry a second load portion between the airfoil portion and the attachment portion; and
  attaching the attachment portion to the aircraft internal to the aircraft fuselage with the connecting portion being rotatable about a rotation axis positioned between the first and second load paths, and with at least part of the connecting portion eccentrically offset from the rotation axis.

52. The method of claim 51 wherein the fuselage includes a passenger cabin, and wherein attaching the attachment portion includes attaching the attachment portion to an unpressurized portion of the fuselage external to the passenger cabin.

53. The method of claim 51 wherein the connecting portion has a minimum cross-sectional area and wherein attaching the attachment portion includes attaching the attachment portion with the rotation axis intersecting the minimum cross-sectional area.

54. The method of claim 51, further comprising coupling an actuator between the connecting portion and the fuselage.

55. The method of claim 51, further comprising coupling a ball screw actuator between the connecting portion and the fuselage.

56. The method of claim 51 wherein the airfoil portion has a maximum chord length, and wherein attaching a connecting portion includes attaching a connecting portion having a chordwise dimension of from about 5% to about 15% of the maximum chord length.

57. The method of claim 51 wherein attaching the canard includes attaching a canard having a second portion that includes a deployable trailing edge device.

58. The method of claim 51 wherein the connecting portion has a minimum cross-sectional area, and wherein the method includes connecting the attachment portion to the fuselage with the rotation axis passing through the minimum cross-sectional area.

59. A method for installing an aircraft canard, comprising:
positioning an airfoil portion of the canard external to an aircraft fuselage, the airfoil portion having a first portion configured to be exposed to an external flow, the airfoil portion further having a second portion movably coupled to the first portion, and the second portion including a flight control surface;
positioning a connecting portion of the canard internal to the fuselage, the connecting portion having an attachment portion;
positioning an interface region of the canard in alignment with an external surface of the fuselage; and
attaching the attachment portion to the aircraft internal to the aircraft fuselage with the connecting portion being rotatable about a rotation axis passing through the interface region, and with at least part of the connecting portion eccentrically offset from the rotation axis.

60. The method of claim 59 wherein the fuselage includes a pressurized passenger cabin, and wherein attaching the attachment portion includes attaching the attachment portion to an unpressurized portion of the fuselage external to the passenger cabin.

61. The method of claim 59 wherein attaching a canard includes attaching a canard having:
a central portion fixed relative to the connecting portion; and
a trailing edge portion movable relative to the central portion and the connecting portion.

62. A method for operating an aircraft canard, comprising:
activating an actuator operatively coupled to an airfoil portion of the canard via a connecting portion, the actuator being positioned internal to a fuselage of the aircraft, the airfoil portion being positioned external to the fuselage;
rotating the connecting portion of the canard; and
rotating the airfoil portion of the canard via the connecting portion at a rate of about 20 degrees or more per second.

63. The method of claim 62 wherein the canard includes a central portion fixed relative to the connecting portion and a trailing edge portion movable relative to the central portion and the connecting portion, and wherein the method further comprises moving the trailing edge portion relative to the central portion.

64. The method of claim 62 wherein activating an actuator includes activating a ball-screw actuator.

* * * * *

UNITED STATES PATENT AND TRADEMARK OFFICE
CERTIFICATE OF CORRECTION

PATENT NO. : 6,929,216 B2
DATED : August 15, 2005
INVENTOR(S) : David L. Bath et al.

It is certified that error appears in the above-identified patent and that said Letters Patent is hereby corrected as shown below:

Column 9,
Line 67, "bath" should be -- both --.

Signed and Sealed this

Twenty-fifth Day of October, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,929,216 B2 | Page 1 of 1 |
| APPLICATION NO. | : 10/689972 | |
| DATED | : August 16, 2005 | |
| INVENTOR(S) | : David L. Bath et al. | |

It is certified that error appears in the above-identified patent and that said Letters Patent is hereby corrected as shown below:

Certificate of Correction
Please correct the Certificate of Correction filed September 18, 2005. The date for the issued U.S. Patent should be as follows: "August 15, 2005" should be
--August 16, 2005--;

Column 9
Line 67, "bath" should be --both--.

Signed and Sealed this

Twenty-fourth Day of October, 2006

JON W. DUDAS
*Director of the United States Patent and Trademark Office*